United States Patent
Olechnowicz et al.

(10) Patent No.: US 7,207,605 B2
(45) Date of Patent: Apr. 24, 2007

(54) TUBE COUPLING

(75) Inventors: Benjamin J. Olechnowicz, Cuyahoga Falls, OH (US); Gerald A. Babuder, Mentor, OH (US); Timothy A. Barney, Aurora, OH (US); Ronald K. Fisher, Ravenna, OH (US)

(73) Assignee: Swagelok Company, Solon, OH (US)

( * ) Notice: Subject to any disclaimer, the term of this patent is extended or adjusted under 35 U.S.C. 154(b) by 0 days.

(21) Appl. No.: 10/604,700

(22) Filed: Aug. 11, 2003

(65) Prior Publication Data

US 2004/0104573 A1 Jun. 3, 2004

Related U.S. Application Data

(63) Continuation of application No. 09/097,379, filed on Jun. 15, 1998, now Pat. No. 6,623,047.

(60) Provisional application No. 60/089,127, filed on Jun. 11, 1998, provisional application No. 60/048,931, filed on Jun. 16, 1997.

(51) Int. Cl.
*F16L 19/00* (2006.01)

(52) U.S. Cl. ..................... 285/328; 285/379

(58) Field of Classification Search ............. 285/328, 285/917, 379; 277/611, 939
See application file for complete search history.

(56) References Cited

U.S. PATENT DOCUMENTS

| 139,877 | A | * | 6/1873 | Dame | 285/328 |
| 579,643 | A | * | 3/1897 | Gleason | 285/330 |
| 787,791 | A | * | 4/1905 | Reynolds | 285/368 |
| 2,464,774 | A | * | 3/1949 | Fennema | 285/330 |
| 3,064,998 | A | * | 11/1962 | Syverson | 285/101 |
| 3,234,708 | A | * | 2/1966 | Berthiaume | 53/88 |
| 3,301,578 | A | * | 1/1967 | Platt et al. | 285/331 |
| 4,254,973 | A | * | 3/1981 | Benjamin | 285/312 |
| 4,842,287 | A | * | 6/1989 | Weeks | 277/641 |
| 4,867,483 | A | * | 9/1989 | Witt et al. | 285/23 |
| 5,066,051 | A | * | 11/1991 | Weigl et al. | 285/328 |
| 5,135,269 | A | * | 8/1992 | Babuder | 285/328 |
| 5,145,219 | A | * | 9/1992 | Babuder | 285/330 |
| 5,163,721 | A | * | 11/1992 | Babuder | 285/328 |
| 5,222,747 | A | * | 6/1993 | McGarvey | 277/614 |

(Continued)

FOREIGN PATENT DOCUMENTS

EP 482865 * 10/1991

(Continued)

*Primary Examiner*—David Bochna
(74) *Attorney, Agent, or Firm*—Calfee, Halter & Griswold LLP (57) ABSTRACT

Coupling components which prevent relative rotation between tubular members when break away torque forces are applied to the tubular members. In one embodiment, the invention is a locking ring for preventing relative axial rotation between two generally tubular members. The ring is shaped to receive a sealing gasket and has two side faces wherein each side face is shaped to frictionally engage one of the tubular members to thereby prevent relative axial rotation between the tubular members. The invention is also directed to a coupling including a locking ring. The tubular members are generally coaxially arranged such that the sealing faces face each other. The coupling comprises a sealing gasket captured between the sealing beads for sealing the coupling, wherein the frictional surfaces engage the sealing gasket to prevent relative rotation between the tubular members.

12 Claims, 5 Drawing Sheets

U.S. PATENT DOCUMENTS 5,306,052 A * 4/1994 MeGushion ................ 285/328
6,070,912 A * 6/2000 Latham ....................... 285/61
6,471,255 B1 * 10/2002 Ulrich ........................ 285/354
6,623,047 B2 * 9/2003 Olechnowicz et al. ...... 285/328

FOREIGN PATENT DOCUMENTS

FR    378493   * 1/1990
JP    5-10482  * 1/1993

* cited by examiner

TUBE COUPLING

CROSS REFERENCE TO RELATED APPLICATIONS

This application is a continuation of U.S. patent application Ser. No. 09/097,379 filed Jun. 15, 1998 now U.S. Pat. No. 6,623,047 for TUBE COUPLING, which claims priority to U.S. provisional application Ser. No. 60/048,931, filed Jun. 16, 1997, and to U.S. provisional application Ser. No. 60/089,127, filed Jun. 11, 1998, the entire disclosures of which are fully incorporated herein by reference.

BACKGROUND OF INVENTION

Field of the Invention

The present invention is directed to tube couplings, and more particularly, to tube couplings and coupling elements which prevent relative rotation between tubular coupling members.

Tube couplings of the type in the present invention are generally shown and described in U.S. Pat. Nos. 3,521,910 and 5,145,219, herein incorporated herein by reference. Those patents describe tube couplings wherein first and second tubular members having central through passages and sealing end faces with annular, raised beads are arranged to sealingly engage on opposite sides of an annular metal gasket. Suitable threaded nut members are then rotated to drive the tubular members toward each other to cause the beads to sealingly engage the gasket.

U.S. Pat. No. 5,145,219 proposes modifications and/or additional components to reduce or eliminate undesired relative movement between the tubular members and between the tubular members and the gaskets. The '219 patent is primarily directed to preventing such relative rotation due to transmitted torque forces. Transmitted torque is the rotational force applied to the tubular members during make up of the fitting. In some situations it may be desired to accommodate "break away" torque, which is a much stronger rotational force applied to the coupling after it is made up. Break away torques may be imparted upon the system by environmental forces, as well as rough handling by operators. When the imparted forces are sufficient so as to cause one coupling member to "break away" and rotate relative the other coupling member, or relative the sealing gasket, the gasket may be scored. Accordingly, there exists a need for a tube coupling which can prevent relative rotation between tubular members when break away torque forces are applied.

SUMMARY OF INVENTION

The present invention resides in various coupling and coupling components which prevent relative rotation between tubular members when break away torque forces are applied to the tubular members. In one embodiment, the invention is a locking ring for preventing relative axial rotation between two generally tubular members. The ring is shaped to receive a sealing gasket and has two side faces wherein each side face is shaped to frictionally engage one of the tubular members to thereby prevent relative axial rotation between the tubular members. The invention also includes a coupling incorporating the locking ring, and a method of making a coupling having a locking ring to prevent relative rotation between the tubular members.

In another preferred embodiment, the invention is a coupling comprising two generally tubular members each having a sealing end face, a raised, annular sealing bead, an inner bore, and a frictional surface located radially outward of the sealing bead. The tubular members are generally coaxially arranged such that the sealing faces face each other. The coupling further comprises a sealing gasket captured between the sealing beads for sealing the coupling, wherein the frictional surfaces engage the sealing gasket to prevent relative rotation between the tubular members.

Various other embodiments of the invention are described and claimed herein, and other features and advantages of the present device will become apparent from the following detailed description, with reference to the accompanying drawings and claims, which form a part of the specification.

DETAILED DESCRIPTION

Figure 1:
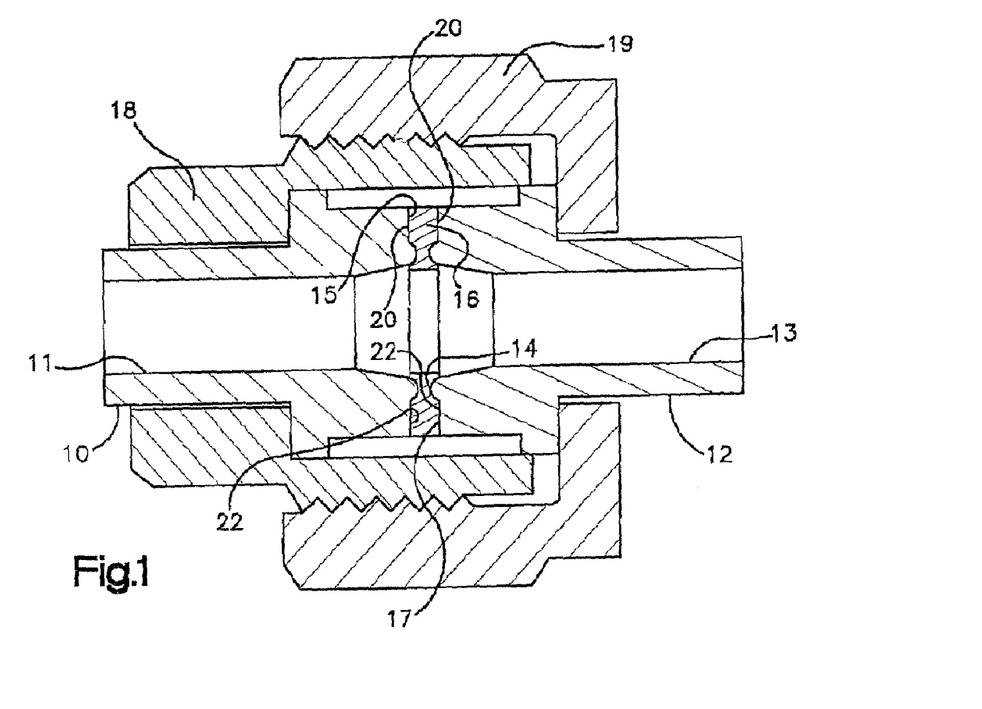
FIG. 1 is a cross-sectional view of one embodiment of the tube coupling of the present invention.
Figure 2:
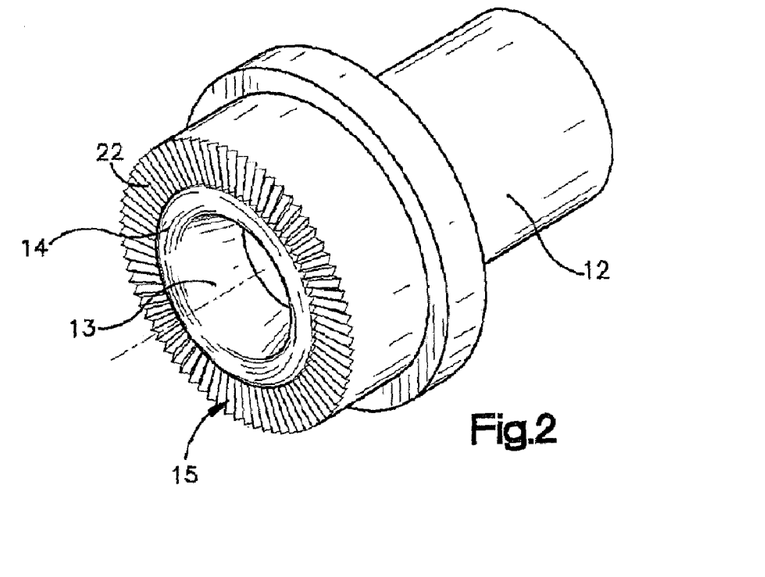
FIG. 2 is a perspective view of one of the tubular members of the coupling of FIG. 1.

As shown in FIGS. 1 and 2, in one embodiment of the invention the coupling includes a pair of opposed generally tubular members 10, 12, each having a central axial cylindrical bore 11, 13. The tubular members 10 and 12 are shown as being identical but, as one skilled in the art will quickly recognize, they could differ from one another in a variety of particulars as shown and discussed in the above-mentioned patents. Each of the members 10, 12 have sealing end faces 15, 17 that include a sealing bead 14 that extends coaxially about the associated bore 11, 13. An annular gasket 16 is positioned between the end faces 15, 17. The sealing beads 14 of each member 10, 12 may be driven into sealing engagement with the opposite side faces 20 of the gasket 16 by cooperating male and female threaded nuts 18 and 19. In this manner, the beads 14 engage the gasket 16 to seal the coupling.

The end faces 15, 17 are provided with frictional surfaces 22 to prevent relative rotation between the members 10, 12 and between the tubular members 10, 12 and the gasket 16. The frictional surfaces 22 lie radially outwardly of the respective sealing beads 14, and engage the generally smooth gasket 16. In the illustrated embodiment, the roughened areas or frictional surfaces 22 are formed by bands of knurling that extend axially forwardly a distance only slightly less than the axial height of the associated bead 14. The dimensions of the knurling allow the frictional surface 22 to positively engage the gasket 16 when the bead 14 is sealingly engaged into the gasket. Whether the knurling extends axially outwardly beyond the associated bead 14 is not, however, critical. The engagement between the knurls and the gasket must be sufficient to ensure that any applied torque on one tubular member is transmitted through the gasket and to the other tubular member. Furthermore, the frictional surfaces 22 may be of nearly any form so long as there is sufficient frictional engagement between the surfaces 22 and the gasket 14. The surface may include various forms of roughening, protrusions, knurling and the like, without departing from the scope of the invention.

It is to be understood that the term "frictional engagement" shall include any means of treating a surface such that the force required to produce relative rotation between the treated surface or surfaces is increased over the force required for a smooth, untreated surface. The term encompasses roughening, knurling, raised protrusions and the like, even though some of these treatments may not increase the force required to produce relative rotation strictly through the increase of frictional forces. For example, knurling may produce the desired results by embedding the raised knurls into the opposite surface, but this is still to be considered increasing the "frictional engagement" for the purposes of this application.

Figures 3, 4, 5:
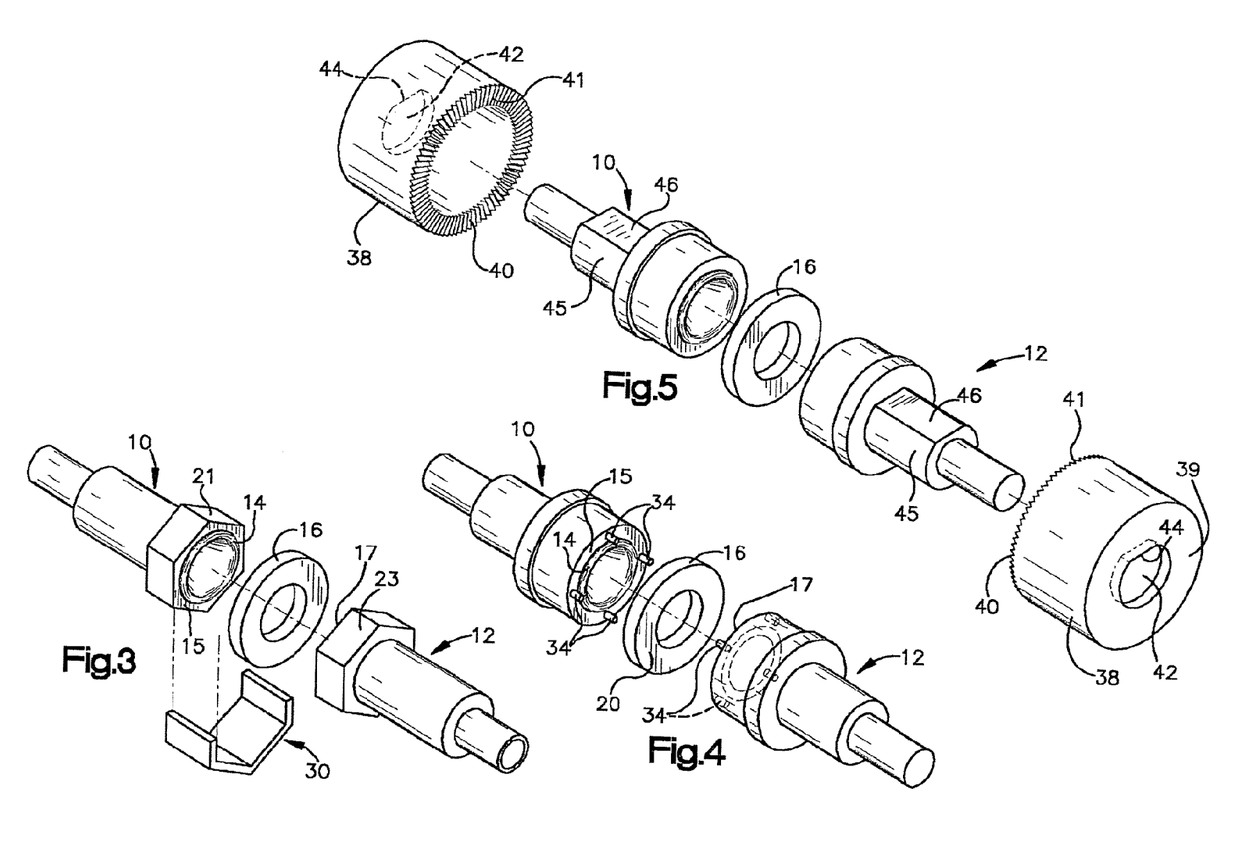
FIG. 3 is an exploded perspective view showing an alternate embodiment of the invention.
FIG. 4 is an exploded perspective view showing another embodiment of the invention.
FIG. 5 is an exploded perspective view showing another embodiment of the invention.

FIG. 3 shows an alternate embodiment which is arranged so as to reduce the relative rotation between the tubular members or the tubular members and the gasket. In this embodiment, each of the tubular members 10, 12 include end portions 21, 23 having a non-circular outer periphery, in this case, a hex configuration. In the illustrated embodiment, the end portions 21, 23 are located radially outwardly of the respective sealing end face 15, 17. The beads 14 are, of course, arranged to engage on opposite sides of the gasket member 16 when driven thereinto by cooperating threaded body portions (not shown). In the FIG. 3 embodiment, the end portions 21, 23 are identical in exterior shape and configuration. During make-up of the fitting, the end faces 15, 17 are positioned in axial alignment with the hex configurations correspondingly aligned. A somewhat U-shaped rigid frame member 30 is then moved transversely into engagement with the surfaces of the hex configuration to hold the members 10 and 12 against relative rotation. The member 30 is held in place on the end portions 21, 23 and totally enclosed by the threaded body members after make-up is completed. It should be understood that nearly any non-circular shape end portions 21, 23 may be used, and nearly any shape or configuration frame member may be used, so long as the frame member 30 can receive the non-circular end portions 21, 23 so as to prevent relative rotation therebetween.

FIG. 4 shows yet another embodiment wherein the sealing end faces 15, 17 have raised protrusions, such as axially extending pins 34, located radially outwardly of the sealing bead 14 to engaged the gasket. The pins 34 may extend any suitable distance to engage the opposite side faces 20 of the gasket 16. In one embodiment, the pins 34 extend outwardly a distance slightly greater than the total height of the beads 14. Here, again, the threaded coupling body portions (not shown) act to drive the pins 34 into direct positive penetrating engagement with the gasket 16. Thus, relative rotation between the tubular members is prevented. In a preferred embodiment, the pins are equally radially spaced.

A still further possible embodiment is shown in FIG. 5. In FIG. 5, the sealing portions of the tubular members 10, 12 and the gasket 16 are enclosed by a pair of cup-shaped members 38 each having a base 39 and a lip portion 41. Each lip portion 41 is shaped to frictionally engage the other lip portion. In the illustrated embodiment the lip portions 41 include teeth 40 shaped to engage the teeth 40 of the other cup-shaped member 38. Each cup-shaped member 38 includes an opening 42 in the base 39 to receive a non-circular portion 46 of the shaft portion 45 of the respective tubular members 10, 12. The openings 42 are provided with at least one flat portion 44 that is arranged to positively engage with a corresponding non-circular portion, or flat 46, formed on the respective tubular member. The interengaging teeth 40 between the two cup members 38 prevent relative rotation between the cup members 38 and their respective tubular members.

Figure 6:
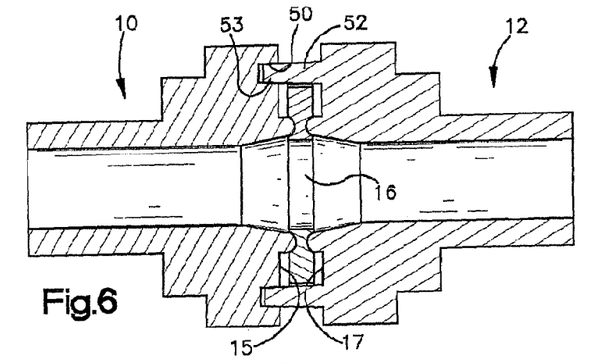
FIG. 6 is a cross-sectional view showing yet another embodiment of the present invention.

In the embodiment illustrated in FIG. 6, the end faces 15, 17 of the tubular members 10, 12 are provided with interengaging elements in the form of a generally radially extending groove 50 formed in end face 15 and a generally radially extending flange 52 formed in the end face 17. The groove 50 may include a taper into which a tapered end portion 53 of the flange is received. The dimensioning of the groove and flange is such that a wedging and binding takes place between the groove 50 and the flange 52 when proper sealing engagement is achieved between the sealing beads 14 and the sealing gasket 16. Two or more sets of interengaging flanges and grooves may be used. Here, again, it should be appreciated that the threaded coupling body portions are not shown.

Figure 7:
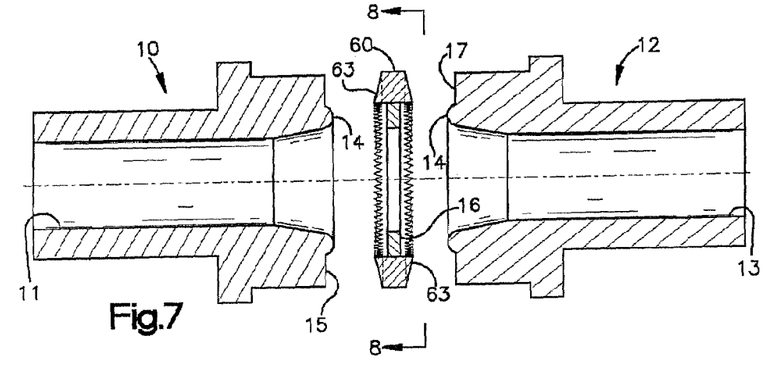
FIG. 7 is an exploded cross-sectional view of another alternate embodiment of the present invention.

FIG. 7 shows an exploded longitudinal cross-sectional view of a further arrangement wherein relative rotation between the tubular members 10 and 12 is prevented when the fitting is made up. In this embodiment, a lock ring 60 formed of a material harder than the tubular members is positioned between the end faces 15, 17. The lock ring 60 receives the gasket 16 therein, and has an inner diameter sized to receive the gasket 16 by an interference fit. In one embodiment, the lock ring 60 may be split so that it is radially resilient to grip the gasket 16. Furthermore, a groove could be placed in the inner diameter of the lock ring 60 so as to receive the gasket 16. The ring 60 is preferably harder than the end faces 15, 17 of the tubular members, and may be made of stainless steel.

Figure 8:
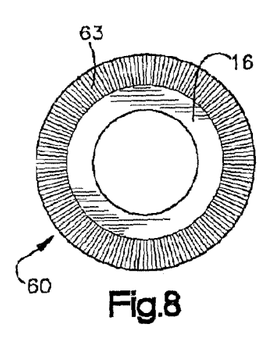
FIG. 8 is a front view taken on line 8—8 of FIG. 7 showing in more detail the lock ring and gasket assembly.

The ring 60 is shaped to frictionally engage the tubular members 10, 12. In one embodiment, the locking ring has a substantially smooth surface on its side faces 63, as even a smooth side face may provide enough friction to reduce relative rotation between the tubular members. In order to increase the frictional engagement, one or more protrusions may be formed on the side faces 63 of the locking ring 60. As shown in FIG. 8, the protrusions may comprise knurls, or raised ridges, extending generally radially on the side face 63.

Figure 8A:
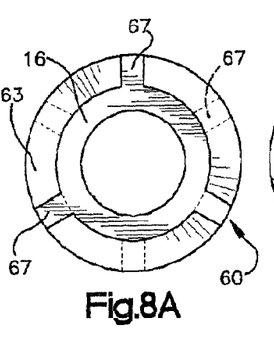
FIG. 8A is a front view of an alternate embodiment of the locking ring that may be used in the coupling of FIG. 7.
Figure 8B:
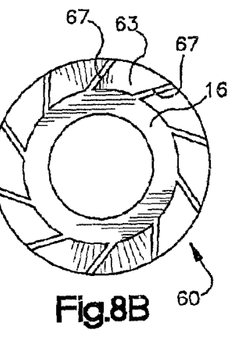
FIG. 8B is a front view of another alternate embodiment locking ring that may be used in the coupling of FIG. 7.

Alternate embodiments for increasing the frictional engagement of the locking ring 60 are illustrated in FIGS. 8A and 8B. FIG. 8A shows a locking ring 60 having a plurality of radially-extending grooves 67 formed in the side faces 63. The grooves may be formed on both sides of the ring 60, and are preferably equally radially spaced. The side walls of each groove form a radially-extending edge which digs into the respective end face 15, 17 during make-up to thereby frictionally engage the end face. FIG. 8B shows an embodiment of the locking ring of the present invention wherein the grooves 67 form an angle with a radially extending line. This arrangement gives each groove 67 a longer edge to improve the frictionally engagement. In yet another embodiment (not illustrated) each side face 63 may be machine roughened so as to form relatively shallow grooves which improve frictional engagement.

As shown in FIG. 7, the opposite side faces 63 of the lock ring are preferably slightly tapered, although the side faces 63 may not be tapered. If a taper is utilized, the taper may be of any suitable angle, and in one preferred embodiment is about 10°. As shown in FIG. 7, the side faces 63 are oppositely inclined with respect to a radial plane such that the width of the ring decreases in the radially outward direction. In this configuration, the inner diameter of the ring extends forwardly to form an edge which digs into the end faces 15, 17, to frictionally engage the tubular members 10, 12. The dimensions of the lock ring may be such that as the tubular members 10 and 12 are brought together into the made up position, sealing engagement of the gasket 16 with the sealing beads 14 takes place substantially simultaneously with engagement of the hardened lock ring 60 with the end faces of the tubular members. Thus, when made up, the lock ring is firmly engaged into the tubular members 10, 12 preventing relative rotation therebetween. However, the coupling may be arranged such that the engagement of the gasket with the sealing beads takes place before, or after, the engagement of the locking ring with the end faces of the tubular members. After make up, the gasket is compressed between the sealing beads to seal the coupling, and the lock ring is preferably embedded in the end faces 15, 17.

Figures 9, 10, 11:
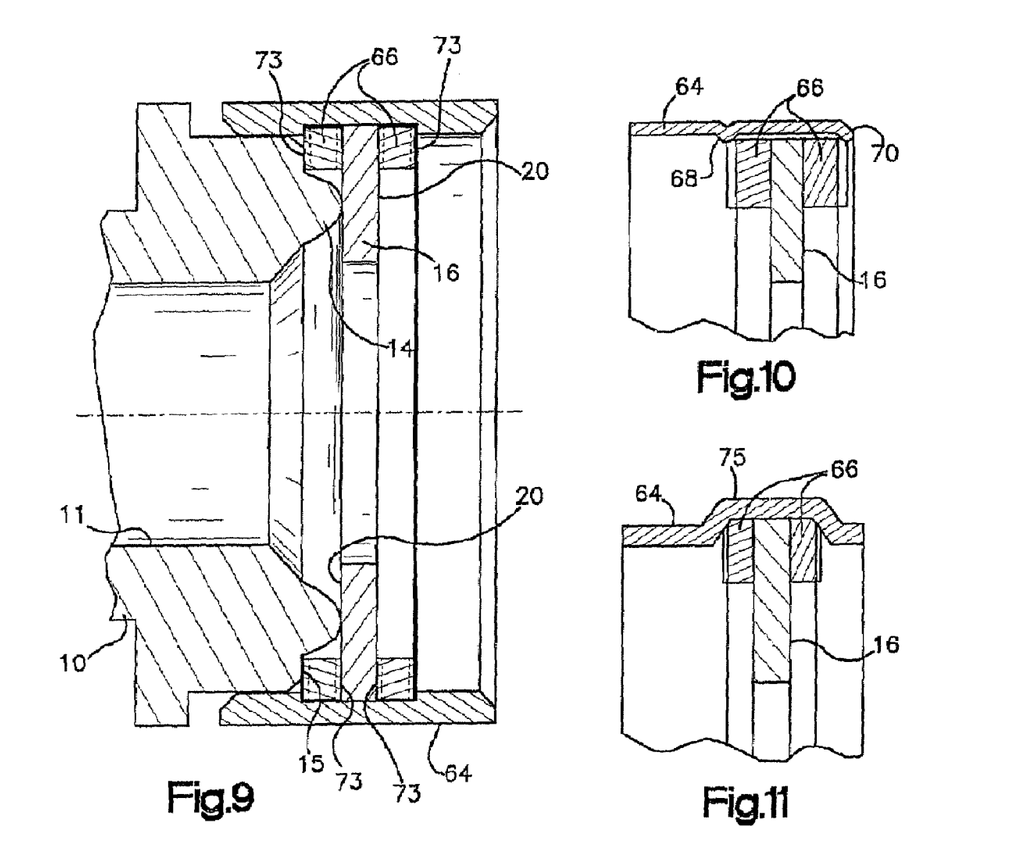
FIG. 9 is a cross-sectional view showing another embodiment of the tube coupling of the present invention.
FIG. 10 is partial cross-sectional view showing another embodiment of the present invention.
FIG. 11 is partial cross-sectional view showing another embodiment of the present invention.

Yet another form of the invention is shown in FIGS. 9–11. As best seen in FIG. 9, wherein only tubular member 10 is shown, there is a split outer ring or sleeve 64 which carries a pair of small locking rings 66 that are formed from a material harder than the tubular members 10 and 12. The locking rings 66 each have a pair of side faces 73, and are located radially outward of the beads 14. The locking rings are assembled in the manner shown by snapping the outer sleeve 64 open and sliding the lock rings 66 in together with an associated gasket 16. The locking rings 66 are located on either side of the gasket 16, and upon make up engage the gasket 16 and associated end faces 15, 17, through roughening, knurling, or forming protrusions on the side faces 73 and/or the end faces 15, 17. Alternately, the side faces 73 and/or the end faces 15, 17 may be smooth, as the smooth surface-to-surface contact may provide enough force to lock the entire assembly together.

The outer sleeve 64 provides a method for pre-mounting the assembly to one or the other of the tubular member members. When the assembly is made up, the small lock rings 66 engage the opposite side face 20 of the gasket 16, and also engage the end faces 15, 17 of the tubular member members 10 and 12. This provides a direct lock through the assembly so that one tubular member cannot rotate relative to the other. Either the side faces 73 of the locking rings, or end faces 15, 17 of the tubular members 10, 12 may be shaped to improve the frictional engagement therebetween through any of the methods discussed above.

FIG. 10 shows a slightly modified form of the embodiment of FIG. 9. In this modification, the outer sleeve member 64 which holds the lock rings 66 in place is formed from a metal stamping in which the gasket and lock rings are held between deformations, or swages, 68 and 70 that extend radially inward. In this embodiment, the outer ring can be a split ring which is deflected radially outward to allow the lock rings and gasket 16 to be inserted, or it can be a solid ring which has a deformation 68 or 70 swaged over after the gasket 16 and lock rings 66 have been assembled therein. A similar arrangement is shown in FIG. 11. In this embodiment, as well as the FIG. 10 embodiment, the extension of the sleeve 64 allows it to be pre-mounted on the tubular member during assembly of the entire fitting. In this modification, the outer sleeve member 64 is radially deformed outwardly to provide a suitable groove 75 for closely receiving the lock rings 66 and the gasket 16 in the position shown. Here, again, the outer sleeve member 64 can be split so that it can be radially deflected to load the lock rings and gasket in place, or it can have one or the other ends swaged inwardly after the lock rings and gaskets have been placed therein.

Figure 12:
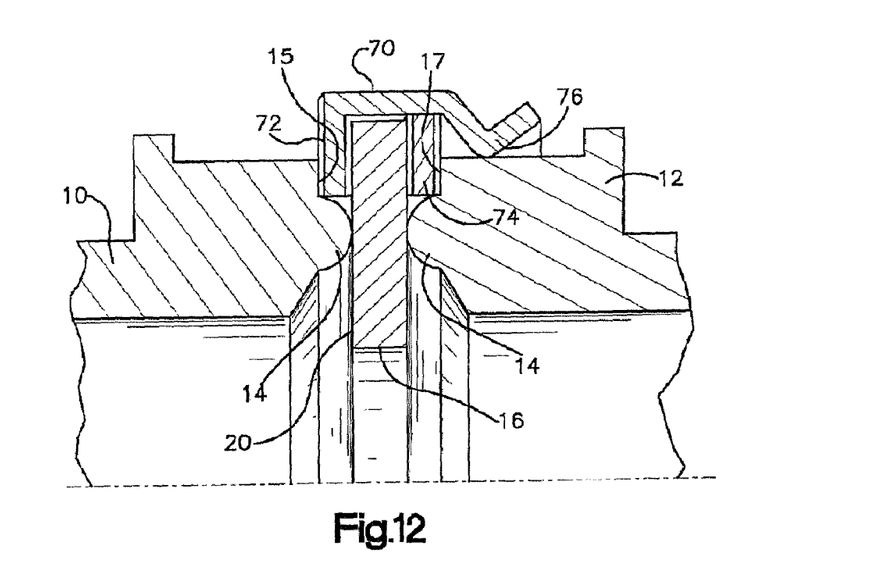
FIG. 12 is a partial cross-sectional view showing another embodiment of the present invention.

A further form of the invention is shown in FIG. 12. In this embodiment, a combined lock ring and housing member, or retainer, 70 retains the sealing gasket 16 and a locking ring 74 in place. The retainer 70 has an inwardly extending portion 72 that is knurled or grooved on both sides so as to provide gripping teeth for engaging the end face 15 of the associated tubular member 10 and the side face 20 of the gasket 16. Again, nearly any means for improving the frictional engagements therebetween may be used, as discussed in greater detail above. Associated with this assembly is a separate lock ring 74 which is received in the assembly as shown and held therein by swaged-in protuberance 76 of the retainer 70, or by making the entire member 70 as a split ring so it can be sprung open to receive gasket 16 and lock ring 74. When the assembly of FIG. 12 is mounted in position between the tubular members and the tubular members are tightened to their sealing position, the gasket and their associated end face of the tubular members 10 and 12 are engaged, thereby providing a direct lock between the two tubular members 10, 12 to prevent relative movement therebetween.

Figure 13:
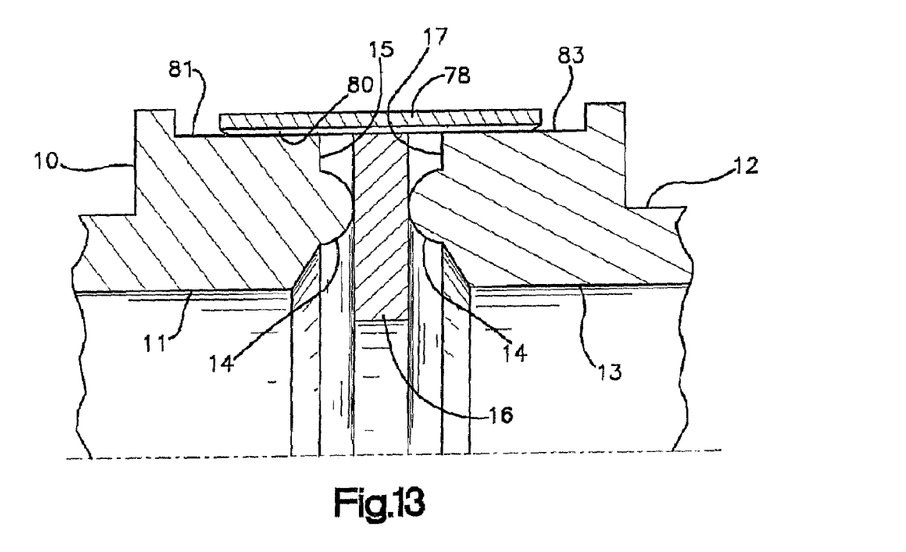
FIG. 13 is partial cross-sectional view showing yet another embodiment of the present invention.

A final, and much simpler, arrangement is shown in FIG. 13. In this embodiment, a single, continuous, relatively rigid and hard ring or sleeve 78 is located about the outer surface 81, 83 of the tubular members 10, 12. The inner diameter of the sleeve is preferably slightly smaller than the outer diameters of the end faces 15, 17. The inner surface of the sleeve 78 preferably has a plurality of axially-extending grooves or sharp edged ribs 80. During make up of the assembly, the ribs 80 are driven into place to grip the outer peripheral surfaces of the members 10 and 12 to prevent subsequent relative rotation of the components relative to one another.

The preferred form of the present invention has been described above. However, with the present disclosure in mind it is believed that obvious alterations to the preferred embodiments, to achieve comparable features and advantages, will become apparent to those of ordinary skill in the art.

The invention claimed is:

1. A coupling comprising:
   first and second generally tubular members each having a sealing end face, a raised, annular sealing bead, an inner bore, and a frictional surface located radially outward of said sealing bead, said tubular members being generally coaxially arranged such that said sealing faces face each other; and
   a sealing gasket captured between said sealing beads for sealing said coupling, wherein said frictional surface engages said sealing gasket to prevent relative rotation between said tubular members; said sealing gasket having two respective sides, wherein said sealing gasket includes a sealing surface on each of said respective sides of said gasket, each of said sealing surfaces contacting one of said sealing beads of said tubular members; and an anti-rotation surface on each of said respective sides of said gasket, each of said anti-rotation surfaces contacting one of said frictional surfaces of said tubular members, wherein each of said respective sealing surfaces and anti-rotation surfaces are co-planar prior to coupling make-up, wherein each of said frictional surfaces has raised protrusions.

2. The coupling of claim 1 wherein said raised protrusions are formed by knurling.

3. The coupling of claim 2 wherein said knurling extends generally radially.

4. A gland for use in a coupling assembly, wherein said gland includes:
   a sealing end face, a raised annular sealing bead located on said sealing end face and an inner bore; and
   a frictional surface comprising a radially extending band located radially outward of said raised annular sealing bead; wherein said sealing bead and said frictional surface are adapted to engage coplanar surfaces of a sealing gasket, wherein said frictional surface has raised protrusions.

5. The gland of claim 4 wherein said raised protrusions are formed by knurling.

6. A coupling comprising:
   first and second generally tubular members each having a sealing end face, a raised, annular sealing bead, an inner bore, and a frictional surface located radially outward of said sealing bead, said tubular members being generally coaxially arranged such that said sealing faces face each other; and
   a sealing gasket captured between said sealing beads for sealing said coupling, wherein said frictional surface engages said sealing gasket to prevent relative rotation between said tubular members;
   wherein said sealing gasket includes a sealing surface that contacts said sealing beads of said tubular members and an anti-rotation surface that contacts said frictional surface of said tubular members, wherein said frictional surface comprises a plurality of axially-extending pins.

7. The coupling of claim 6 wherein each pin extends axially forwardly a distance slightly greater than its respective bead.

8. The coupling of claim 6 wherein said pins are generally equally radially spaced.

9. A coupling comprising:
   first and second generally tubular members each having a sealing end face, a raised, annular sealing bead, an inner bore, and a frictional surface located radially outward of said sealing bead, said tubular members being generally coaxially arranged such that said sealing faces face each other; and
   a sealing gasket captured between said sealing beads for sealing said coupling, wherein said frictional surface engage said sealing gasket to prevent relative rotation between said tubular members;
   wherein said sealing gasket includes a sealing surface that contacts said sealing beads of said tubular members and an anti-rotation surface that contacts said frictional surface of said tubular members, wherein said first tubular member includes a generally radially-extending flange received in a groove on said second tubular member, wherein said flange extends forwardly from said sealing face of said first tubular member.

10. The coupling of claim 9 wherein said flange has a taper portion that reduces in thickness in an axial direction, and therein said groove is correspondingly tapered to closely receive said flange.

11. The coupling of claim 9 further comprising a second groove on said second tubular member and a second flange on said first tubular member, said second flange being disposed in said second groove.

12. The coupling of claim 9 wherein said groove and said flange are located radially outward of said gasket.

* * * * *